United States Patent
Kim et al.

(10) Patent No.: US 11,077,752 B2
(45) Date of Patent: Aug. 3, 2021

(54) VEHICLE ACCELERATOR PEDAL HAVING DUAL HYSTERESIS GENERATING STRUCTURE

(71) Applicant: KYUNG CHANG INDUSTRIAL CO., Ltd., Daegu (KR)

(72) Inventors: Hyeon Uk Kim, Daegu (KR); Beom Jun Kim, Daegu (KR)

(73) Assignee: KYUNG CHANG INDUSTRIAL CO., Ltd.

( * ) Notice: Subject to any disclaimer, the term of this patent is extended or adjusted under 35 U.S.C. 154(b) by 0 days.

(21) Appl. No.: 16/781,626

(22) Filed: Feb. 4, 2020

(65) Prior Publication Data

US 2020/0254874 A1 Aug. 13, 2020

(30) Foreign Application Priority Data

Feb. 8, 2019 (KR) .................. 10-2019-0014830

(51) Int. Cl.
*B60K 26/02* (2006.01)
*G05G 1/44* (2008.04)
*G05G 5/05* (2006.01)

(52) U.S. Cl.
CPC .............. *B60K 26/02* (2013.01); *G05G 1/44* (2013.01); *G05G 5/05* (2013.01); *G05G 2505/00* (2013.01)

(58) Field of Classification Search
CPC ......... G05G 1/44; G05G 5/05; G05G 2505/00
See application file for complete search history.

(56) References Cited

U.S. PATENT DOCUMENTS

| | | | | |
|---|---|---|---|---|
| 1,700,643 A | * | 1/1929 | Nordell | G05G 1/30 74/513 |
| 8,726,759 B2 | * | 5/2014 | Mannle | G05G 1/38 74/512 |
| 9,110,494 B2 | * | 8/2015 | Kim | G05G 1/44 |
| 9,141,127 B2 | * | 9/2015 | Kim | G05G 5/05 |
| 9,471,085 B2 | * | 10/2016 | Viethen | B60K 26/021 |
| 2018/0253120 A1 | * | 9/2018 | Kim | G05G 5/05 |

FOREIGN PATENT DOCUMENTS

KR 10-1401403 B1 6/2014
KR 10-1539140 B1 7/2015

* cited by examiner

*Primary Examiner* — Vicky A Johnson
(74) *Attorney, Agent, or Firm* — The Belles Group, P.C.

(57) ABSTRACT

Disclosed is a vehicle accelerator pedal that may include a cylindrical hinge unit, a lever unit having one side configured to operate in a first direction and another side formed to correspond to an inner circumferential edge of the hinge unit and configured to operate in a second direction opposite the first direction. An outer circumferential edge may be configured to come into close contact with an upper inner circumferential edge of the hinge unit such that a moment of force is applied in a first rotation direction by the hinge unit. An elastic unit having one side may be configured to elastically support one side of the lever unit, the other side formed to correspond to the inner circumferential edge of the hinge unit. An outer circumferential edge may be configured to come into close contact with a lower inner circumferential edge of the hinge unit.

7 Claims, 10 Drawing Sheets

【FIG. 1】
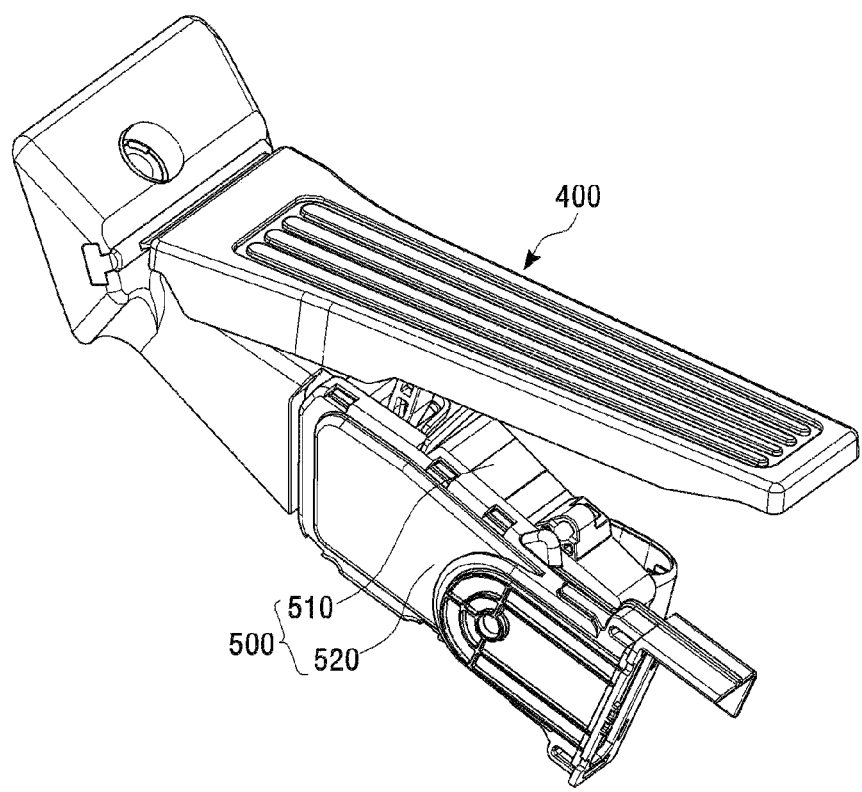

[FIG. 2]
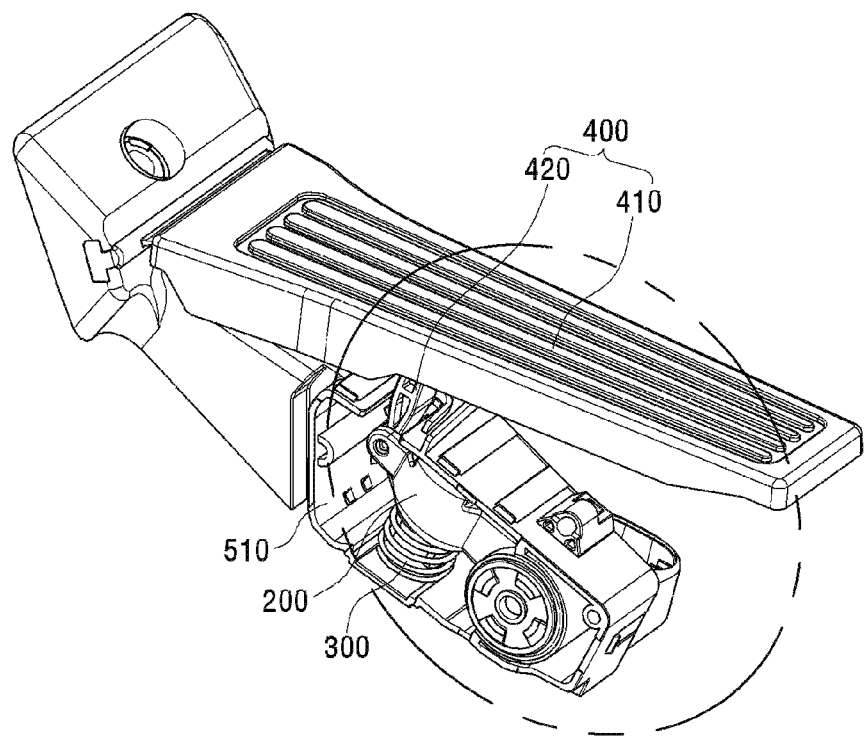

[FIG. 3]
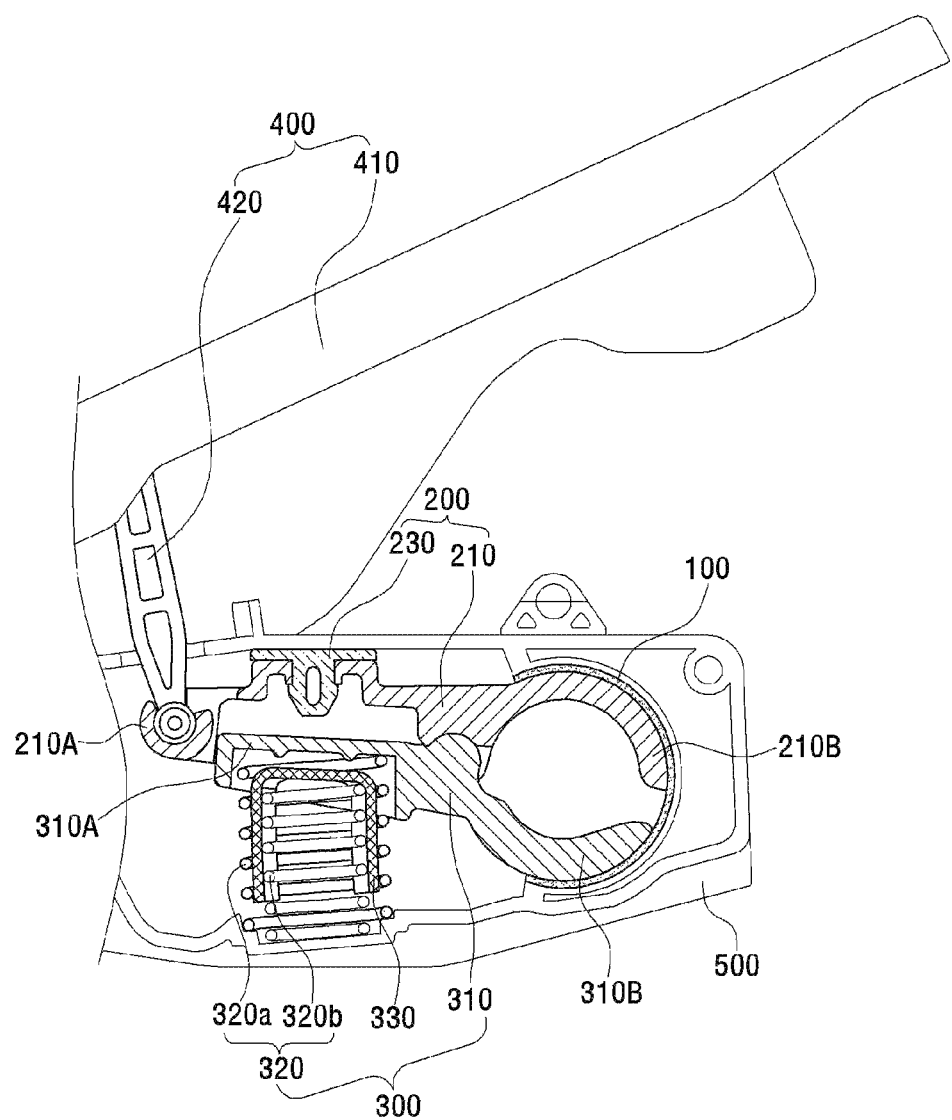

[FIG. 4]
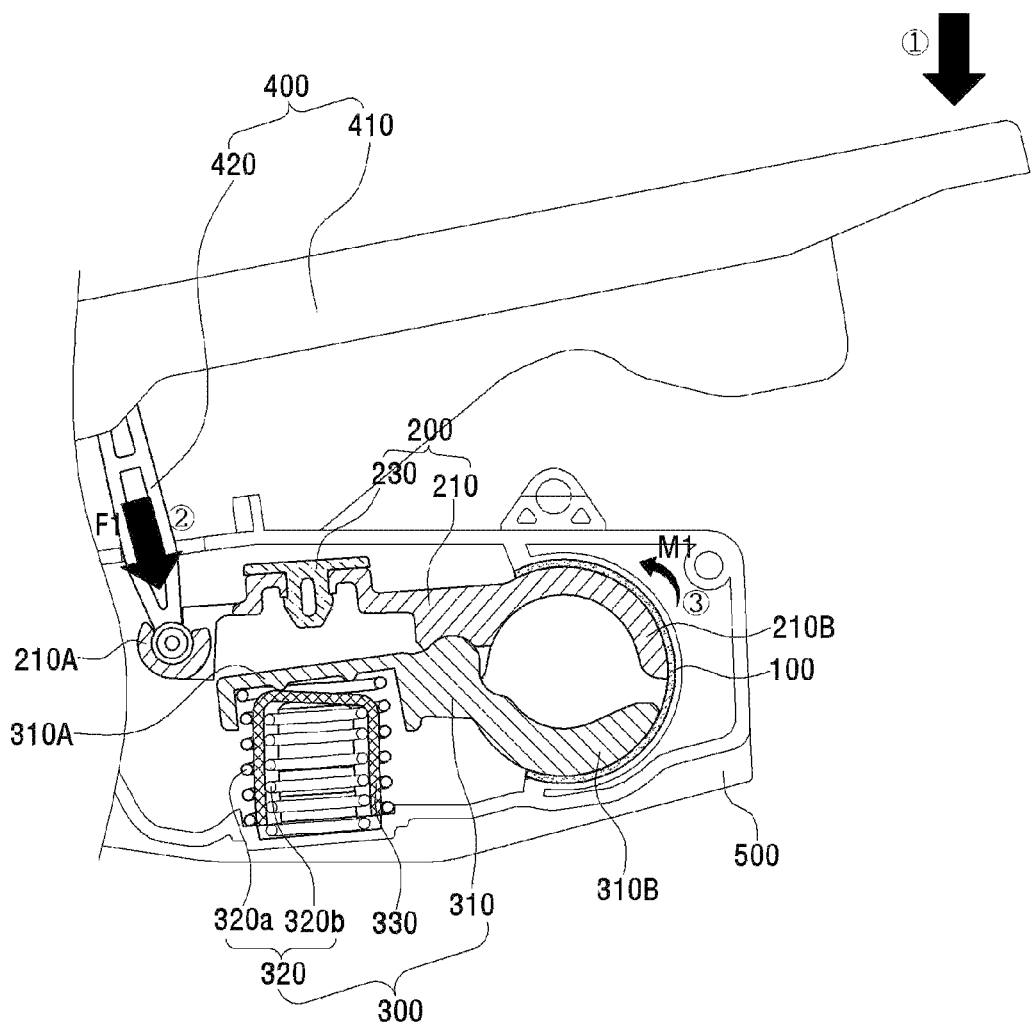

[FIG. 5]
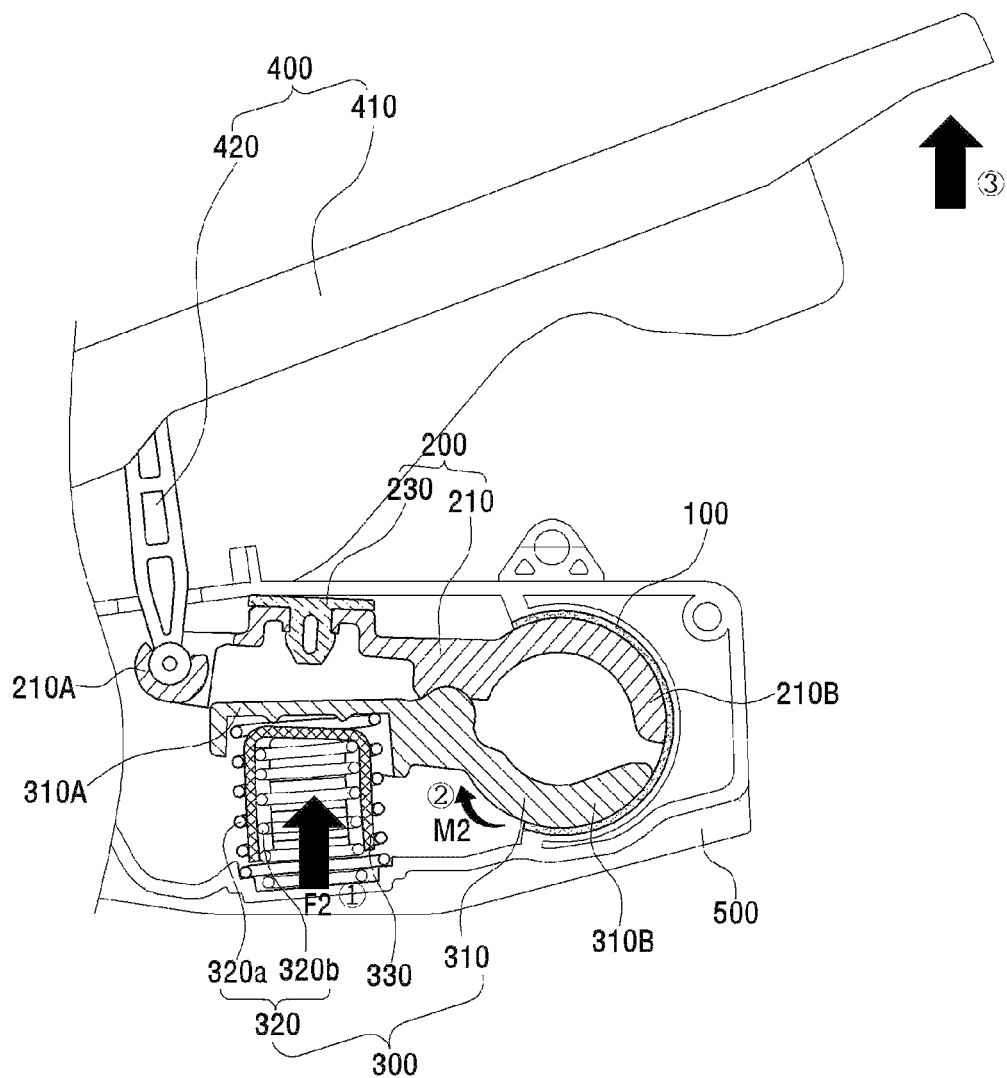

【FIG. 6】
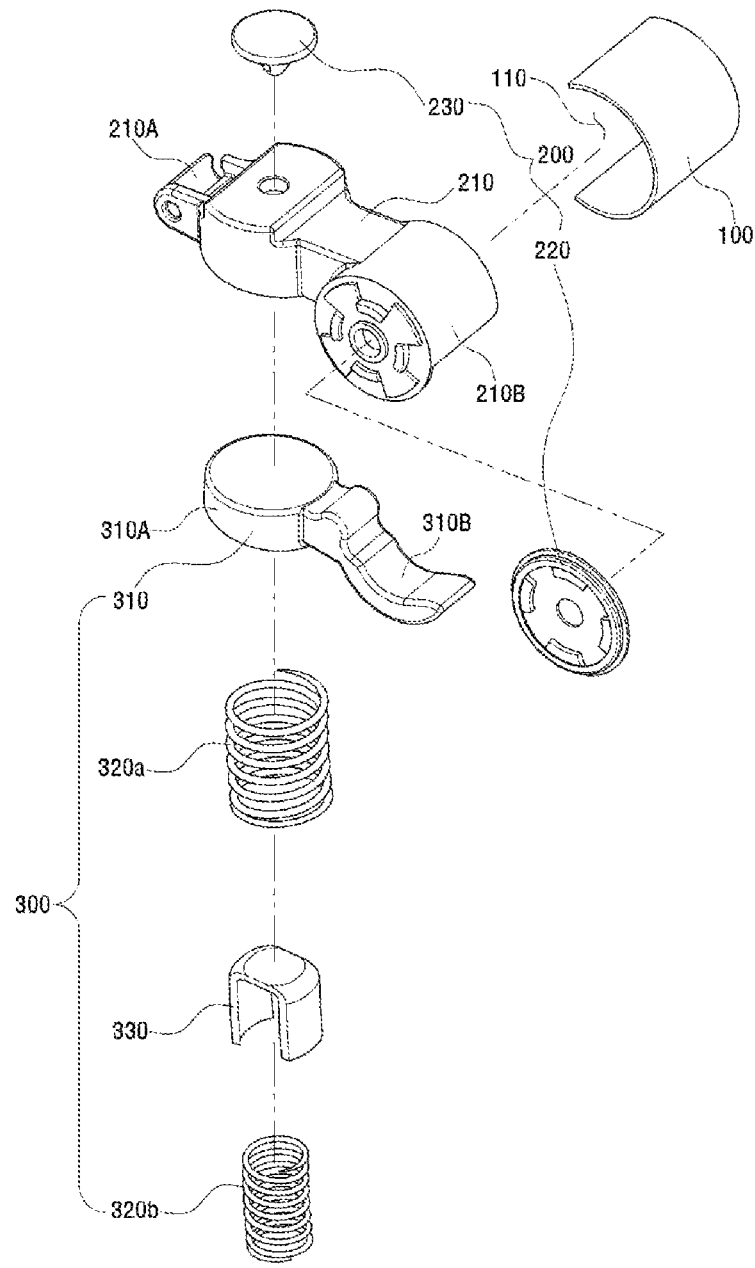

【FIG. 7】
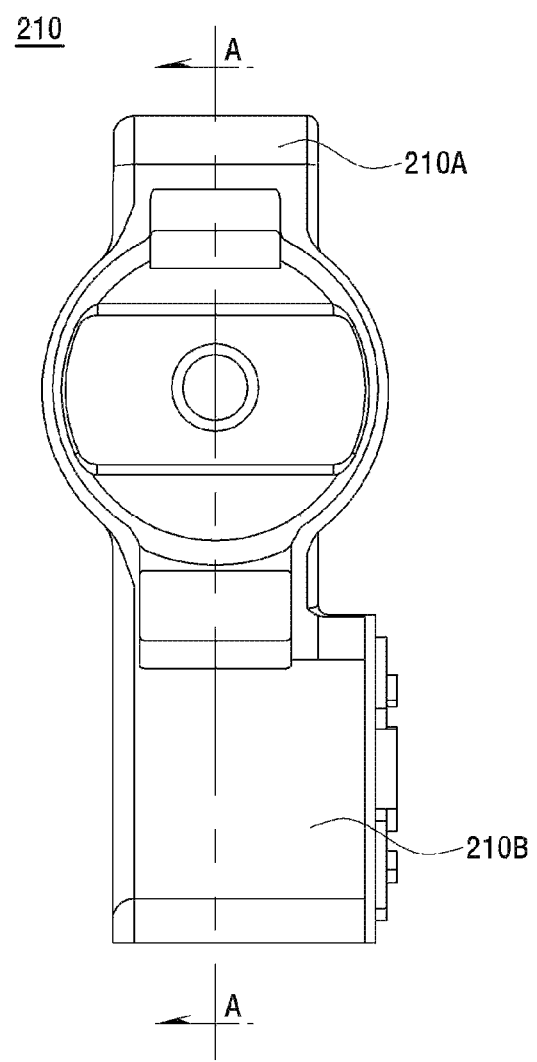

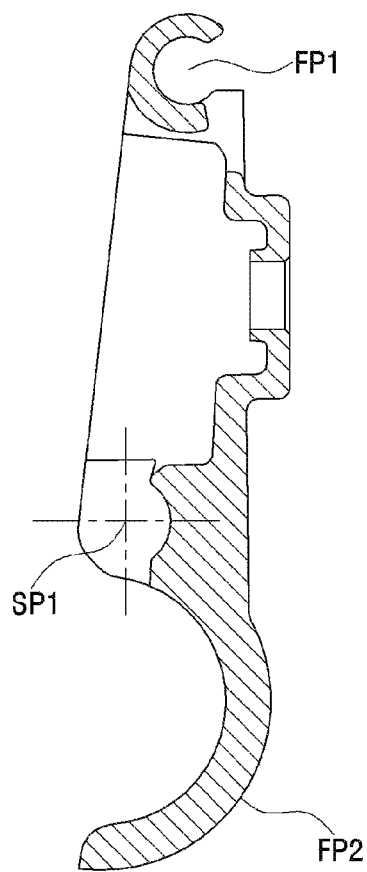
[FIG. 8]

[FIG. 9]
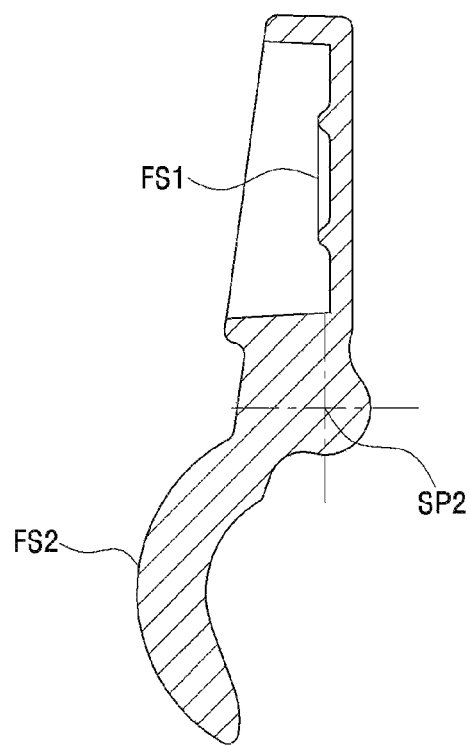

[FIG. 10]
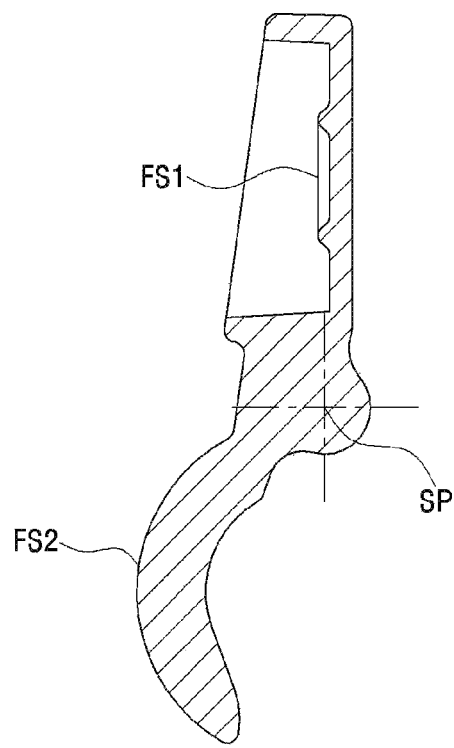
[FIG. 11]
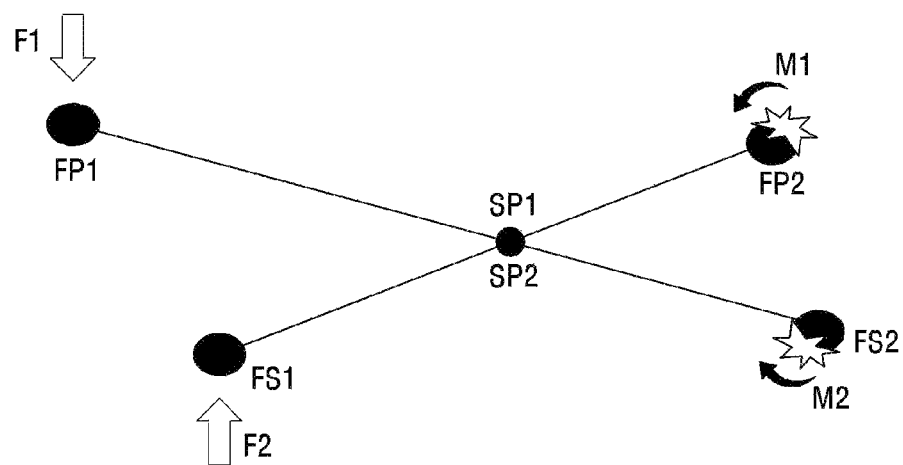

_US 11,077,752 B2_

VEHICLE ACCELERATOR PEDAL HAVING DUAL HYSTERESIS GENERATING STRUCTURE

CROSS-REFERENCE TO RELATED APPLICATIONS

This application claims priority to and the benefit of Korean Patent Application No. 10-2019-0014830 filed in the Korean Intellectual Property Office on Feb. 8, 2019, the entire contents of which are incorporated herein by reference.

TECHNICAL FIELD

The present invention relates to a vehicle accelerator pedal, and more particularly, to a vehicle accelerator pedal having a dual hysteresis generating structure.

BACKGROUND ART

An accelerator pedal is used to accelerate an operation of an engine. A driver pushes the accelerator pedal to increase a rotational speed of the engine and accelerate a vehicle, and the driver releases the accelerator pedal to decrease the rotational speed. The accelerator pedal is connected to a throttle valve through a wire and a linkage. When the accelerator pedal is pushed, the throttle valve is opened, air is drawn into cylinders, and an electronically controlled fuel injection device detects the amount of air and supplies gasoline suitable for an engine operating state.

As the accelerator pedal, there are a mechanical accelerator pedal and an electronic accelerator pedal. The mechanical accelerator pedal is mechanically connected, by a cable, to the throttle valve of the engine. A position of the electronic accelerator pedal is detected by a sensor, and the operation of the throttle valve is controlled based on a detected position signal.

The mechanical accelerator pedal has an operational problem due to an ambient environment, a change in temperature, a degradation of the cable, and the like. Therefore, the mechanical accelerator pedal is being currently substituted with the electronic accelerator pedal. Because the electronic accelerator pedal requires no cable, an enough installation space is ensured, a driver's fatigue is reduced, and fuel economy is improved.

However, the driver prefers a tactile response that the driver feels from the mechanical accelerator pedal in the related art. In addition, hysteresis needs to be generated to reduce the driver's fatigue caused by the operation of the electronic accelerator pedal.

The hysteresis generating technologies, which are applied to the electronic accelerator pedals in the related art, include a structural friction method, a housing friction method, and the like, but have problems of having complicated structures and requiring many components.

Even in a case in which the accelerator pedal has a hysteresis generating structure, a load is concentrated on a particular site having a narrow area and causes abrasion. As a result, there is a problem such as a return defect in which the pedal does not return to its original position after the pedal is released.

DOCUMENTS OF RELATED ART

Patent Documents (Patent Document 1) Korean Patent No. 10-1401403 (published on Jun. 19, 2014)

(Patent Document 2) Korean Patent No. 10-1539140 (published on Jul. 23, 2015)

SUMMARY OF THE INVENTION

The present invention has been made in an effort to provide a vehicle accelerator pedal capable of reducing a driver's ankle fatigue when an accelerator pedal repeatedly operates.

The present invention has also been made in an effort to provide a vehicle accelerator pedal capable of easily changing a magnitude of hysteresis and providing the hysteresis by using a comparatively simple configuration.

The present invention has also been made in an effort to provide a vehicle accelerator pedal capable of solving a return defect of a pedal by reducing abrasion by dispersing a load which is concentratedly applied to a particular site because of characteristics of a hysteresis generating structure using hinge friction.

However, the object of the present invention is not limited to the above-mentioned objects but may be variously expanded without departing from the spirit and scope of the present invention.

An exemplary embodiment of the present invention provides a vehicle accelerator pedal including: a cylindrical hinge unit; a lever unit having one side configured to operate in a first direction in conjunction with a pedal unit, the other side formed to correspond to an inner circumferential edge of the hinge unit and configured to operate in a second direction opposite to the first direction, and an outer circumferential edge configured to come into close contact with an upper inner circumferential edge of the hinge unit such that a moment of force is applied in a first rotation direction by the hinge unit; and an elastic unit having one side configured to elastically support one side of the lever unit, the other side formed to correspond to the inner circumferential edge of the hinge unit, and an outer circumferential edge configured to come into close contact with a lower inner circumferential edge of the hinge unit such that a moment of force is applied in a second rotation direction opposite to the first rotation direction by the hinge unit.

By a force applied to the pedal unit, one side of the lever unit may be moved downward and the other side of the lever unit may be moved upward, such that moment of force may be applied counterclockwise by the hinge unit.

The elastic unit may be disposed below the lever unit, and one side of the elastic unit may be moved upward and the other side of the elastic unit may be moved downward by an elastic force, such that a moment of force may be applied clockwise by the hinge unit.

The moment of force in the first rotation direction may be gradually increased as the close contact surface area between the outer circumferential edge of the other side of the lever unit and the inner circumferential edge of the hinge unit is gradually increased as the force is applied to the pedal unit, and the moment of force in the second rotation direction may be gradually increased as the close contact surface area between the outer circumferential edge of the other side of the elastic unit and the inner circumferential edge of the hinge unit is gradually increased as the force is eliminated from the pedal unit.

The lever unit may include a first load point at which a force is applied to one side by the pedal unit, a first action point at which the other side is brought into contact with the upper inner circumferential edge of the hinge unit by the force applied to the pedal unit, and a first central axis disposed between the first load point and the first action point and configured to serve as a rotation center axis of the lever unit.

The elastic unit may include a second load point at which an elastic force is applied to one side, a second action point at which the other side is brought into contact with the lower inner circumferential edge of the hinge unit by the elastic force, and a second central axis disposed between the second load point and the second action point and configured to serve as a rotation center axis of the elastic unit.

The lever unit and the elastic unit may be coupled such that the first central axis and the second central axis are axially coincident with each other.

The elastic unit may include an elastic member disposed below one side and configured to provide an elastic force.

The lever unit may include a stopper disposed at an upper side of one side of the lever unit and configured to maintain a spacing distance between one side of the lever unit and an internal space of a housing configured to accommodate the elastic unit and the lever unit.

The pedal unit may include a pedal arm having one side fixed to a vehicle body so as to be rotatable at a predetermined angle, and a push portion protruding downward from the pedal arm and configured to press one side of the lever unit.

According to the present invention, with the application of the first principle of the lever, the hysteresis may be generated by generating a high frictional force even with a small load, and as a result, it is possible to reduce a driver's ankle fatigue caused by repeatedly pressing of the vehicle accelerator pedal.

It is possible to provide the vehicle accelerator pedal capable of easily changing a magnitude of the hysteresis and generating the hysteresis by using a comparatively simple configuration.

It is possible to solve a return defect of the pedal by reducing abrasion of the hinge unit by dispersing, to a broad range, a load which is concentratedly applied to a particular site because of the characteristics of the hysteresis generating structure using friction of the hinge unit.

However, the effect of the present invention is not limited to the above-mentioned effects but may be variously expanded without departing from the spirit and scope of the present invention.

BRIEF DESCRIPTION OF THE DRAWINGS

FIG. 1 is a view illustrating a vehicle accelerator pedal according to an exemplary embodiment of the present invention.

FIG. 2 is a view illustrating the vehicle accelerator pedal according to the exemplary embodiment of the present invention (a housing cover is not illustrated).

FIG. 3 is a partially cross-sectional view of FIG. 2 when the pedal is in a free state.

FIG. 4 is a partially cross-sectional view of FIG. 2 and illustrates an operational principle when the pedal is in a pressed state (first control state).

FIG. 5 is a partially cross-sectional view of FIG. 2 and illustrates an operational principle when the pedal is in a released state (second control state).

FIG. 6 is an exploded view of FIG. 2 (a housing unit and a pedal unit are not illustrated).

FIG. 7 is a view illustrating a lever unit according to the exemplary embodiment of the present invention (a stopper is not illustrated).

FIG. 8 is a view illustrating a cross section taken along line A-A in FIG. 7.

FIG. 9 is a view illustrating an elastic unit according to the exemplary embodiment of the present invention (an elastic member and a protector are not illustrated).

FIG. 10 is a view illustrating a cross section taken along line B-B in FIG. 9.

FIG. 11 is a view illustrating an operational principle of the vehicle accelerator pedal according to the exemplary embodiment of the present invention.

DETAILED DESCRIPTION

The following detailed description of the present invention will be made with reference to the accompanying drawings illustrating specific exemplary embodiments for carrying out the present invention. These exemplary embodiments will be described in detail enough to carry out the present invention by those skilled in the art. It should be understood that various exemplary embodiments of the present invention are different from one another but need not be mutually exclusive. For example, particular shapes, structures, and characteristics described herein in respect to one exemplary embodiment may be implemented in other exemplary embodiments without departing from the spirit and scope of the present invention. In addition, it should be understood that the position or arrangement of each constituent element in the respective disclosed exemplary embodiments may be changed without departing from the spirit and scope of the present invention. Therefore, the following detailed description is not considered as having limited meanings, and the scope of the present invention, if adequately explained, is limited only by the appended claims as well as all the scopes equivalent to the features claimed in the appended claims. Like reference numerals in the drawings refer to the same or similar function throughout several aspects.

Hereinafter, a vehicle accelerator pedal having a dual hysteresis generating structure according to an exemplary embodiment of the present invention will be described with reference to the accompanying drawings. In particular, in the present invention, when a driver pushes a pedal unit 400, the other side 210B of a lever unit comes into close contact with an upper inner circumferential edge of a hinge unit 100, such that a moment of force is applied in a first rotation direction M1 (counterclockwise) to generate frictional force. When the driver releases the pedal unit 400, the other side 310B of an elastic unit comes into close contact with a lower inner circumferential edge of the hinge unit 100, such that a moment of force is applied in a second rotation direction M2 (clockwise) to generate frictional force. That is, the present invention provides the vehicle accelerator pedal that uses the two hysteresis generating members, thereby dispersing a concentrated load which is a problem with a frictional force generating structure using a hinge.

FIG. 1 is a view illustrating a vehicle accelerator pedal according to an exemplary embodiment of the present invention.

FIG. 2 is a side view of the vehicle accelerator pedal according to the exemplary embodiment of the present invention, in which a housing cover 520 is not illustrated in order to show an internal configuration in the housing body 510.

FIG. 3 is a partially cross-sectional view in FIG. 2 and illustrates an operational principle when the pedal is in a free state. FIG. 4 is a view illustrating an operational principle when the pedal is in a pressed state (first control state). FIG.

5 is a view illustrating an operational principle when the pedal is released and becomes in a released state (second control state).

FIG. 6 is an exploded view of FIG. 2, in which a housing unit 500 and the pedal unit 400 are not illustrated.

FIG. 7 is a view illustrating a lever unit 200 according to the exemplary embodiment of the present invention, in which a stopper 230 is not illustrated. FIG. 8 is a view illustrating a cross section taken along line A-A in FIG. 6.

FIG. 9 is a view illustrating an elastic unit 300 according to the exemplary embodiment of the present invention, in which an elastic member 320 and a protector 330 are not illustrated. FIG. 10 is a view illustrating a cross section taken along line B-B in FIG. 9.

Referring to FIGS. 1 and 2, the vehicle accelerator pedal according to the exemplary embodiment of the present invention may include the pedal unit 400, the hinge unit 100, the lever unit 200, the elastic unit 300, and the housing unit 500.

The housing unit 500 may include the housing body 510 having therein an accommodation space, and a housing cover 520 configured to seal the accommodation space.

The hinge unit 100, the lever unit 200, and the elastic unit 300 may be accommodated in the accommodation space.

The pedal unit 400 may include a pedal arm 410 having one side fixed to a vehicle body so as to be rotatable at a predetermined angle, and a push portion 420 protruding downward from the pedal arm 410 to press one side 210A of the lever unit.

As illustrated in FIG. 6, a connection structure between the pedal unit 400 and the lever unit 200 may be a hinge structure in which an end of the push portion 420 and one side 210A of the lever unit are hingedly connected to each other. The connection structure and configuration between the pedal unit 400 and the lever unit 200 are limited as long as the pedal unit 400 may stably press one side 210A of the lever unit.

The hinge unit 100 is formed in a cylindrical shape, and one side of the hinge unit 100 may be fixed in the accommodation space of the housing body 510.

The hinge unit 100 may include an opening portion 110 that may accommodate therein the lever unit 200 to be described below and the other side 310B of the elastic unit. The opening portion 110 is opened in a radial direction such that the connection portions for connecting one side 210A and the other side 210B of the lever unit 200 and one side 310A and the other side 310B of the elastic unit 300 penetrate the opening portion 110.

According to the present invention, hysteresis is generated as moments of force are applied in opposite rotation directions by friction between the hinge unit 100 and the lever unit 200 or between the hinge unit 100 and the elastic unit 300.

Therefore, in the present invention, a spacing distance of the opening portion 110 is not limited, but an area of an inner circumferential edge of the hinge unit 100 needs to generate friction with the lever unit 200 or the elastic unit 300 and generate hysteresis characteristics.

Referring to FIGS. 3 to 8, the lever unit 200 may include a lever body 210 (hereinafter, referred to as the lever unit 200) coupled to the elastic unit 300 and configured to operate in conjunction with the pedal unit 400, a lever cover 220 fastened to a lateral surface of the other side 210B of the lever unit, and the stopper 230.

The lever unit 200 may include one side 210A configured to operate in conjunction with the pedal unit 400, the other side 210B formed to correspond to the hinge unit 100, and the connecting portion configured to connect one side 210A and the other side 210B.

One side 210A of the lever unit is operated in a first direction F1 by the pedal unit 400, the other side 210B of the lever unit is operated in a second direction F2 opposite to the first direction F1, and an outer circumferential edge of the lever unit comes into close contact with the upper inner circumferential edge of the hinge unit 100, such that the moment of force may be applied in the first rotation direction M1 by the hinge unit 100.

By a force applied to the pedal unit 400, one side 210A of the lever unit 200 is moved downward, and the other side 210B of the lever unit 200 is moved upward, such that the moment of force may be applied counterclockwise by the hinge unit 100.

The stopper 230 may maintain a spacing distance between an internal space of the housing body 510 and an upper surface of one side 210A of the lever unit.

The stopper 230 may be made of an elastic material in order to absorb a shock when the housing body 510 and one side 210A of the lever unit come into contact with each other.

The lever unit 200 may include a separate configuration to fasten the lever unit 200 and the stopper 230, and the separate configuration may be a through hole.

Referring to FIGS. 3 to 6, 9, and 10, the elastic unit 300 may include an elastic unit body 300 (hereinafter, referred to as the elastic unit 300) coupled to the lever unit 200, the elastic members 320 disposed below one side 310A of the elastic unit and configured to provide an elastic force, and the protector 330 configured to prevent an interference and a trap between the elastic members 320.

The elastic unit 300 may include one side 310A configured to elastically support one side 210A of the lever unit, the other side 310B formed to correspond to the inner circumferential edge of the hinge unit 100, and the connecting portion configured to connect one side 310A and the other side 310B.

Due to the elastic force of the elastic members 320, one side 310A of the elastic unit is operated in the second direction F2, the other side 310B of the elastic unit is operated in the first direction F1, and the outer circumferential edge of the elastic unit comes into close contact with the lower inner circumferential edge of the hinge unit 100, such that the moment of force may be applied in the second rotation direction M2 by the hinge unit 100.

The elastic unit 300 is disposed below the lever unit 200. In conjunction with the downward movement of one side 210A of the lever unit 200 caused by the force applied to the pedal unit 400, an elastic restoring force is generated as the force applied to the pedal unit 400 is cancelled out in a state in which the elastic unit 300 is elastically compressed by the elastic force. As the force applied to the pedal unit 400 is eliminated, one side 310A is moved upward and the other side 310B is moved downward by the elastic restoring force (in the present invention, the elastic force and the elastic restoring force may be collectively referred to as an elastic force), such that the moment of force may be applied clockwise by the hinge unit 100.

As illustrated in FIGS. 3 to 6, the elastic members 320 may include a second elastic member 320b disposed inside the protector 330, and a first elastic member 320a disposed outside the protector 330.

The number of elastic members 320 is proposed as an exemplary embodiment, but the present invention is not limited to the number of elastic members 320. That is, the number of elastic members 320 may be changed and applied based on an elastic modulus of the elastic member 320.

FIG. 11 is a view illustrating an operational principle of the vehicle accelerator pedal according to the exemplary embodiment of the present invention.

Referring to FIGS. 3 to 5, and 11, the lever unit 200 may include a first load point FP1 at which the force is applied to one side 210A by the pedal unit 400, a first action point FP2 at which the other side 210B is brought into contact with the upper inner circumferential edge of the hinge unit 100 by the force applied to the pedal unit 400, and a first central axis SP1 disposed between the first load point FP1 and the first action point FP2 and configured to serve as a rotation center axis of the lever unit 200.

In addition, the elastic unit 300 may include a second load point FS1 at which the elastic force is applied to one side 310A, a second action point FS2 at which the other side 310B is brought into contact with the lower inner circumferential edge of the hinge unit 100 by the elastic force, and a second central axis SP2 disposed between the second load point FS1 and the second action point FS2 and configured to serve as a rotation center axis of the elastic unit 300.

The lever unit 200 and the elastic unit 300 may be coupled to each other and then accommodated in the housing body 510. The lever unit 200 and the elastic unit 300 may be coupled to each other so that the first central axis SP1 and the second central axis SP2 are axially coincident with each other.

Referring to FIG. 3, when the pedal unit 400 is in the free state, the spacing distance between the outer circumferential edge of the other side 210B of the lever unit and the inner circumferential edge of the hinge unit 100 is equal to the spacing distance between the outer circumferential edge of the other side 310B of the elastic unit and the inner circumferential edge of the hinge unit 100.

Referring to FIG. 4, when the pedal unit 400 is in the pressed state (first control state), the outer circumferential edge of the other side 210B of the lever unit is in close contact with the inner circumferential edge of the hinge unit 100.

In other words, by the force applied from the pedal unit 400, one side 210A of the lever unit, that is, the first load point FP1 is moved in the first direction F1 (downward) and the other side 210B of the lever unit is moved in the second direction F2 (upward), such that the close contact portion between the outer circumferential edge of the lever unit 200 and the inner circumferential edge of the hinge unit 100, that is, the area of the first action point FP2 is gradually increased, and thus the moment of force in the first rotation direction M1 (counterclockwise) is gradually increased, thereby generating the hysteresis.

In this case, one side 310A of the elastic unit may be moved in the first direction F1 and may compress the elastic members 320, and the other side 310B of the elastic unit may be spaced apart from a lower side of the inner circumferential edge of the hinge unit 100 at a predetermined distance.

Referring to FIG. 5, in a state (second control state) in which the force is eliminated from the pedal unit 400, the outer circumferential edge of the other side 310B of the elastic unit is in close contact with the inner circumferential edge of the hinge unit 100.

In other words, by the elastic force of the elastic member 320, the other side 310B of the elastic unit, that is, the second load point FS1 is moved in the second direction F2 (upward) and the other side 310B of the elastic unit is moved in the first direction F1 (downward), such that the close contact portion between the outer circumferential edge of the other side 310B of the elastic unit and the inner circumferential edge of the hinge unit 100, that is, the area of the second action point FS2 is gradually increased, and thus the moment of force in the second rotation direction M2 (clockwise) is gradually increased, thereby generating the hysteresis.

In this case, one side 210A of the lever unit is moved in the second direction F2 to move the push portion 420 of the pedal unit 400 in the second direction F2, thereby returning the pedal arm 410 to the original position. The other side 210B of the lever unit may be spaced apart from an upper side of the inner circumferential edge of the hinge unit 100 at a predetermined distance.

That is, the vehicle accelerator pedal according to the present invention may generate the hysteresis both in the first control state in which the lever unit 200 is pressed by the pedal unit 400 and the second control state in which the pressing operation of the pedal unit 400 is released and the elastic unit 300 is pressed by the elastic member 320.

The contact area between the hinge unit 100 and the lever unit 200 is gradually increased as the pedal unit 400 is pressed, and the contact area between the hinge unit 100 and the elastic unit 300 is also gradually increased as the elastic force is applied by the elastic member 320, such that the concentrated load, which is a problem with a hinge friction structure, may be dispersed, thereby preventing abrasion of the hinge unit 100 and a return defect of the pedal.

FIG. 11 is a view illustrating an operational principle of the vehicle accelerator pedal according to the exemplary embodiment of the present invention.

Referring to FIG. 11, the present invention may adopt the first principle of the lever in which the lever unit 200 includes the first load point FP1 and the first action point FP2, the elastic unit 300 includes the second load point FS1 and the second action point FS2, and the first central axis SP1 and the second central axis SP2, which are axially coupled as the lever unit 200 and the elastic unit 300 are coupled, serve as support points.

According to the present invention, by the force applied to the pedal unit 400, the first load point FP1 of the lever unit 200 is moved in the first direction F1 and the first action point FP2 is moved in the second direction F2, such that the moment of force in the first rotation direction M1 is generated as a range in which the first action point FP2 and the hinge unit 100 are in close contact with each other is increased.

By the elastic force of the elastic member 320, the second load point FS1 of the elastic unit 300 is moved in the second direction F2 and the second action point FS2 is moved in the first direction F1, such that the moment of force in the second rotation direction M2 is generated as a range in which the second action point FS2 and the hinge unit 100 are in close contact with each other is increased.

According to the present invention as described above, no separate friction member is required to generate the hysteresis, and the hysteresis may be generated by friction at the action point between the lever unit 200 and the hinge unit 100 and the action point between the elastic unit 300 and the hinge unit 100, that is, at the two action points.

As a result, the hysteresis is generated as a frictional force is increased at the first action point FP2 between the lever unit 200 and the hinge unit 100 as the driver applies a pedal effort to the pedal unit 400, and the hysteresis is generated as a frictional force is increased at the second action point FS2 between the elastic unit 300 and the hinge unit 100 even though the driver eliminates the pedal effort from a pedal pad.

The features, structures, effects, and the like described above in the exemplary embodiments are included in one exemplary embodiment of the present invention, but the present invention is not necessarily limited to one exemplary embodiment. Furthermore, the features, structures, effects, and the like described in the respective exemplary embodiments may be combined or modified and then carried out by those skilled in the art as another exemplary embodiment. It should be interpreted that the combination and modification are included in the scope of the present invention.

While the exemplary embodiments have been described above, but the exemplary embodiments are just illustrative and not intended to limit the present invention. It can be appreciated that various modifications and alterations, which are not described above, may be made to the present exemplary embodiment by those skilled in the art without departing from the intrinsic features of the present invention. For example, the respective constituent elements specifically described in the exemplary embodiments may be modified and then carried out. Further, it should be interpreted that the differences related to the modifications and alterations are included in the scope of the present invention defined by the appended claims.

What is claimed is:

1. A vehicle accelerator pedal comprising:
   a cylindrical hinge unit;
   a lever unit having one side configured to operate in a first direction in conjunction with a pedal unit, the other side formed to correspond to an inner circumferential edge of the hinge unit and configured to operate in a second direction opposite to the first direction, and an outer circumferential edge configured to come into close contact with an upper inner circumferential edge of the hinge unit such that a moment of force is applied in a first rotation direction by the hinge unit; and
   an elastic unit having one side configured to elastically support one side of the lever unit, the other side formed to correspond to the inner circumferential edge of the hinge unit, and an outer circumferential edge configured to come into close contact with a lower inner circumferential edge of the hinge unit such that a moment of force is applied in a second rotation direction opposite to the first rotation direction by the hinge unit,
   wherein the moment of force in the first rotation direction is gradually increased as a close contact surface area between the outer circumferential edge of the other side of the lever unit and the upper inner circumferential edge of the hinge unit is gradually increased as the force is applied to the pedal unit, and the moment of force in the second rotation direction is gradually increased as the close contact surface area between the outer circumferential edge of the other side of the elastic unit and the lower inner circumferential edge of the hinge unit is gradually increased as the force is eliminated from the pedal unit;
   wherein a first central axis is disposed between the one side and the other side of the lever unit and is configured to serve as a rotation center axis of the lever unit, and a second central axis is disposed between the one side and the other side of the elastic unit and is configured to serve as a rotation center axis of the elastic unit; and
   wherein the lever unit and the elastic unit are coupled such that the first central axis and the second central axis are axially coincident with each other.

2. The vehicle accelerator pedal of claim 1, wherein by a force applied to the pedal unit, one side of the lever unit is moved downward and the other side of the lever unit is moved upward, such that moment of force is applied counterclockwise by the hinge unit.

3. The vehicle accelerator pedal of claim 1, wherein the elastic unit is disposed below the lever unit, and one side of the elastic unit is moved upward and the other side of the elastic unit is moved downward by an elastic force, such that a moment of force is applied clockwise by the hinge unit.

4. The vehicle accelerator pedal of claim 1, wherein the lever unit comprises a first load point at which a force is applied to one side by the pedal unit, a first action point at which the other side is brought into contact with the upper inner circumferential edge of the hinge unit by the force applied to the pedal unit, and the first central axis disposed between the first load point and the first action point, the elastic unit comprises a second load point at which an elastic force is applied to one side, a second action point at which the other side is brought into contact with the lower inner circumferential edge of the hinge unit by the elastic force, and the second central axis disposed between the second load point and the second action point.

5. The vehicle accelerator pedal of claim 1, wherein the elastic unit comprises an elastic member disposed below one side of the elastic unit and configured to provide an elastic force.

6. The vehicle accelerator pedal of claim 1, wherein the lever unit further comprises a stopper disposed at an upper side of one side of the lever unit and configured to maintain a spacing distance between one side of the lever unit and an internal space of a housing configured to accommodate the elastic unit and the lever unit.

7. The vehicle accelerator pedal of claim 1, wherein the pedal unit comprises:
   a pedal arm having one side fixed to a vehicle body so as to be rotatable at a predetermined angle; and
   a push portion protruding downward from the pedal arm and configured to press one side of the lever unit.

* * * * *